United States Patent [19]
Lehmann

[11] Patent Number: 5,287,729
[45] Date of Patent: Feb. 22, 1994

[54] METHOD OF AND APPARATUS FOR A LEAKAGE TESTING

[76] Inventor: Martin Lehmann, Obere Farnbuhlstrasse 1, 5610 Wohlen, Switzerland

[21] Appl. No.: 708,226

[22] Filed: May 31, 1991

[30] Foreign Application Priority Data

Jun. 1, 1990 [DE] Fed. Rep. of Germany ....... 4017693

[51] Int. Cl.⁵ ............................................. G01M 3/36
[52] U.S. Cl. ............................................ 73/49.3; 73/52
[58] Field of Search ............... 73/49.3, 52, 45.4, 49.2

[56] References Cited

U.S. PATENT DOCUMENTS

| | | | |
|---|---|---|---|
| 4,747,299 | 5/1988 | Fox et al. | 73/49.3 |
| 4,899,574 | 2/1990 | Potteiger | 73/49.3 X |
| 5,033,287 | 7/1991 | Watanabe et al. | 73/49.3 X |

FOREIGN PATENT DOCUMENTS

| | | | |
|---|---|---|---|
| 44637 | 3/1984 | Japan | 73/49.3 |
| 77633 | 3/1990 | Japan | 73/49.3 |

*Primary Examiner*—Tom Noland
*Assistant Examiner*—Joseph W. Roskos
*Attorney, Agent, or Firm*—Antonelli, Terry, Stout & Kraus

[57] ABSTRACT

To test a closed container having at least one flexible wall area in order to determine a leakage by an increasing of the inner volume of the container and a measuring of a correspondingly caused changed measured value, at least one outer wall area of the container is exposed to a medium having a pressure which is greater than a pressure produced by the increase of the volume of the container if such has no leakage. The increase of the volume can be made by a pneumatic or mechanical application of a force at a flexible wall area. The arrangement is specifically suitable when the wall of the container or its contents strive to self-seal a leakage spot in a wall area.

22 Claims, 4 Drawing Sheets

METHOD OF AND APPARATUS FOR A LEAKAGE TESTING

FIELD OF THE INVENTION

The present invention relates to a method for leakage testing of closed containers having a wall structure which is flexible at least at certain areas, according to which method the inner volume of the container is increased and the change of a measured variable caused therewith is evaluated as leakage indication.

It also relates to an apparatus for a leakage testing of closed containers having at least one flexible wall area.

The method and the apparatus are specifically applicable for containers having a self-sealing content or wall property such as cardboard containers for fruit juices, milk beverages, containers having a multilayer, e.g. laminated wall structure.

BACKGROUND OF THE INVENTION

U.S. Pat. No. 4,901,558 discloses a method of leakage testing containers having a wall structure which is flexible at least at some areas. The containers are thereby placed into a vacuum chamber and latter is evacuated and the bulging of the flexible wall areas of the containers is evaluated as measured value or signal and depending from their behaviour the determination of the presence of a leakage or tight state is made.

The disclosure refers also to problems which occur when the containers tested in this way are filled by contents which clog prevailing leakage areas. Apart from the contents the structure of such containers, such as containers having cardboard walls which at the inside have a plastic coating can lead to the fact that leakage areas obtain a valve-like characteristic, i.e. when a pressure differential is applied across the wall directed from the inside towards the outside these leakage areas tend to act in a self-sealing manner. Inspite of such, however, also such leakages cannot be tolerated because they lead to a spoiling of the contents.

Specifically the technique disclosed in mentioned U.S. Pat. No. 4,901,558 is detrimental for such containers or containers filled with such contents, because the pressure differential during the testing acts from the inside towards the outside due to the fact that a vacuum is applied around the container.

SUMMARY OF THE INVENTION

It is, therefore, an object of the present invention to provide a method and an apparatus of the type mentioned above which solves the problems encountered in the prior art.

A further object is to provide a method comprising arranging of the container by at least one wall area located at its outside in an atmosphere of a medium of which the pressure is greater than the pressure inside of the container which pressure inside results from the increase of the internal volume of the container.

A still further object of the present invention is to provide an apparatus which comprises means for applying a pulling load on the container and adapted to be locally placed at a flexible wall area of the container; means for holding the container and adapted to hold the container during and against exertion of the pulling load at the mentioned wall area; and at least one measuring sensor for detection of a measured value which changes due to the pulling load at mentioned wall section.

Yet a further object is to provide a method and an apparatus proceeding from the basic recognition that the mentioned containers having a self-sealing tendency, may such be due to their wall structure or the contents, can only then be safely and simply be leakage tested, when the valve or diode characteristic at such container leakage areas is considered. Thus, during testing a pressure differential is applied which acts from the outside to the inside, opening such self-sealing leaks.

If now, as could be assumed at an initial consideration, this is attempted in that the container is arranged in its entirety, thus completely in an atmosphere which is controlled to a higher pressure than that in the container, the result is that the flexible wall areas of the container bulge inwards and that inside of the container substantially the same pressure as at the outside of the container is achieved. Thus, the mentioned valve characteristic is not considered.

Therefore, it is a further object of the invention to depart from known techniques, namely, to increase the volume of the container by evacuating the surroundings of the container and thus causes an outward bulging of the walls of the container, but to maintain in accordance with the invention, the pressure at least one area of the outside walls of the container greater than the minimal pressure which is established inside of the leakproof or tight container due to enlarging its volume. By means of this it is possible that, similar to a suction bellows, a pressure differential is generated at the wall area from the outside towards the inside, such that then a medium may flow towards the inside through the leak and is not impaired by the content and/or structure of the wall. The flow of medium rather opens the leak. Thus, the valve characteristic of such leaks clearly exploited.

Yet a further object of the present invention is to provide a method according to which the increase of the volume of the container is produced by application a pressure at least at one flexible wall area, which pressure is less than the initial pressure inside of the container. By means of such procedure the wall area bulges outwardly and a "suctioning" effect appears at a further wall area in contact with the medium.

Yet another object of the present invention is to provide a method according to which the increase of the volume is produced by pulling members which are mechanically drawn apart and which, for example, and, preferably, are connected to flexible wall sections by suction.

A further object of the present invention is to provide a method wherein the measured variable, compared with a preset behavior or a preset threshold value, in order to decide if leakages of a predetermined maximal magnitude are present or not, is established in that the travel, may such be the travel of bulging outwards or the travel of bulging inwards of a wall area at the container is sensed or the speed or the acceleration of such movement of the wall area of the container.

Yet a further object of the present invention is to provide a method whereby the measured variable is established by measuring the pressure of the medium or the tension in a flexible container wall area, for example, by strain gauges. If a leakage is present in the container wall area which is contacted by the medium, the result will be such that, due to the suction bellows action an inflow of the medium into the container occurs which, when the atmosphere of the medium is closed off against the environment, leads to a pressure change in the closed off medium which can be sensed as measured variable.

Because, further, according to given containers and their purpose of use, maximal allowable leakages are limitably tolerated and, as a zero leakage is never realistic, it is not possible by the proposed procedure to prevent the medium and specifically a gaseous medium from entering the container through small leakages which would be tolerable.

In order to prevent a contamination of the content of the container by the medium, e.g. in the form of a testing gas during the test in case of contents critical to such contaminations, such as food, it is a further object of the invention to provide a method wherein the container is supported during the test at least along substantial wall sections in an atmosphere of a sterile gas, such as in an atmosphere of sterile air or nitrogen.

A further object is to provide a method wherein the pressure of the medium is selected to be equal to the initial pressure inside of the container and, if this pressure corresponds to atmospheric pressure, the pressure of the medium is either selected also to correspond to atmospheric pressure, or to have a pressure which is higher than atmospheric pressure.

It has been mentioned that a leak in a container which is apt to self-sealing or in a container of which the content is apt to a self-sealing, forms an element having a valve characteristic relative to flow of medium. Thus, it also is an object of the invention to provide a method wherein an oscillating change of container volume is caused, by which, depending from the temporary change of volume, such being an increase of the volume or a decrease of the volume, oscillating measurement values can be sensed having differing half wave shapes similar to a rectifier effect by a diode element.

A further object of the present invention is to provide a method according to which areas of the container which are specifically prone to leakages are exposed to the medium, such as, for example, welding seams. It is thereby, however, easily possible to test the leakage behavior of complete containers in accordance with mentioned procedure in that, according to a further object of the invention, a method is provided wherein different, possibly all wall areas of the container are exposed to the medium.

A further object of the present invention is to provide an apparatus in which the means for application of a pulling load include at least one suction jaw adapted to be placed onto the flexible wall area in a sealed manner.

Yet a further object of the present invention is to provide an apparatus in which the means for application of a pulling load comprise at least one suction cup coupled to a pulling drive member.

A still further object of the present invention is to provide an apparatus which includes at least one chamber system and pressure source, which pressure source is adapted to act on the chamber designed to form a sealed chamber having at least one chamber wall area formed by a wall area of the container which is not acted upon by the means for applying a pulling load.

A further object of the present invention is to provide an apparatus in which the means for applying of a pulling load are connected to a drive device adapted to cause a time dependent pulling loading.

Yet a further object of the present invention is to provide an apparatus having a drive device adapted to cause an oscillating loading.

A still further object of the present invention is to provide an apparatus in which a measuring sensor includes a position sensor for a container wall area, such as a capacitive or inductive position sensor, or an optoelectronic measuring sensor or a wire strain gauge.

Yet another object of the present invention is to provide a method wherein the leakage of containers is tested which include a self-sealing content or wall structure, such as cardboard containers for fruit juices, milk beverages and/or containers having a multi-layer wall structure.

BRIEF DESCRIPTION OF THE DRAWINGS

The invention will be better understood and objects other than those set forth above will become apparent when consideration is given to the following detailed description thereof, when taken in connection with the accompanying drawings, wherein.

DETAILED DESCRIPTION

Figure 1:
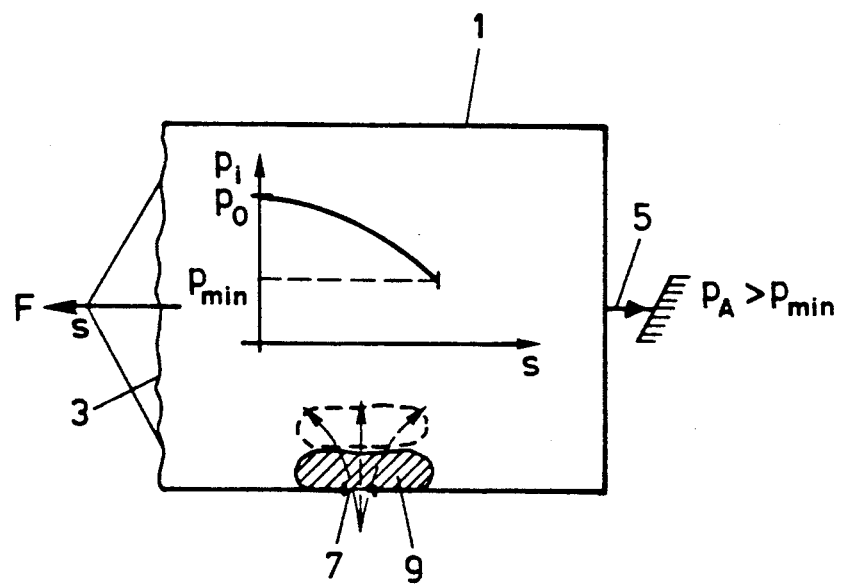
FIG. 1 is an illustration of the principles of the method and apparatus of the present invention.

Referring now to the drawings wherein like reference numerals are used throughout the various views to designate like parts and, more particularly, to FIG. 1, according to this figure, the container 1 has a wall structure area 3 which is fashioned of a flexible but substantially non-elastic material such as, for example, cardboard. The container is assumed to be filled and to have an inner pressure $p_0$. In accordance with the invention, the container 1, with its flexible wall structure area 3 is subjected to a loading of the type which increases the volume of the container 1. The container 1 is, for example, held at one side at an abutment 5 which is located opposite of the flexible wall 3, with the flexible wall 3 being expanded by a force F.

Initially, a non-leaking tight container is considered. Due to the increase of the volume of the container 1, the inner pressure $p_i$, which initially has the value $p_0$, decreases as shown in FIG. 1. If a leak 7 is present, which leak 7 is illustrated in a largely exaggerated manner in FIG. 1, at any place in the wall of the container 1, such as at the flexible wall structure area 3 or further wall areas in FIG. 1 which further wall areas may have a form-stable nature, and if a medium having a pressure $p_A$, preferably, a gas, is provided around the container 1, with the pressure of the gas being higher than the inner pressure $p_{min}$ of the container 1 which is the minimal pressure value arrived at by the increase of the volume, the preferably gaseous medium will be suctioned through the lead 7 into the container 1 at a point in time where the inner pressure $p_i$ of the container falls to a value below the outer pressure $p_A$.

A schematically illustrated particle 9 of the contents of the container or a loose part at the wall of the leak 7 is moved by the flow of the gas, with the flow being illustrated in phantom lines so that the particle 9 is displaced into the interior of the container 1 and does not prevent the flow of the gaseous medium.

Since the flexible wall structure 3 travels in a manner similar to a spring member through a force dependent travel distance s, the extent of which depends upon the existence or non-existence of a leak, a measuring sensor (not shown) senses, for example, the amount of travel s of the building of the flexible wall area 3 or, if the travel s is predetermined, the force F necessary to reach the predetermined travel distance s of the speed or acceleration of the displacement of the wall area 3.

A further possibility of generating a measured value signal is by sensing of the tension in the wall area 3 by, for example, a wire strain gauge (DMS).

A further sensing of a measured value signal arises when the medium with the pressure $p_A$ arranged outside of the container is provided in a closed chamber, to sense the decrease of the pressure $p_A$ caused by an inflowing of this medium through the leak 7.

Figure 2:
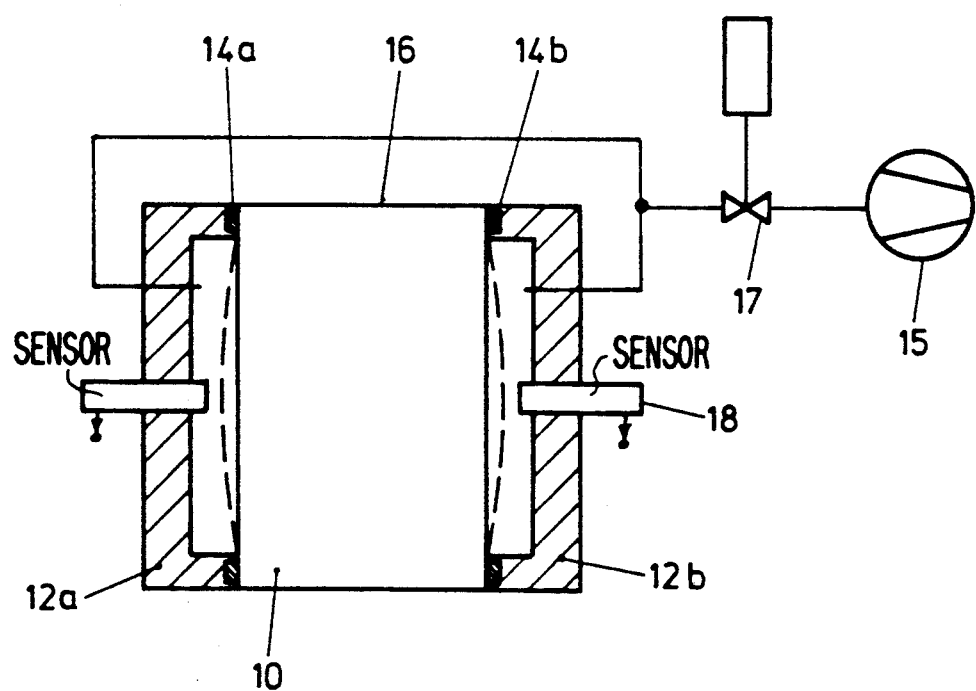
FIG. 2 is a schematic partial cross-sectional view of the apparatus of the present invention operating in accordance with the method of the present invention for testing a rectangular container such as, for example, a container for orange juice or milk.

In the container 10 of FIG. 2 which, for example, is of a rectangular shape, such as a conventional container for milk, orange juice, etc., is contacted at two surfaces, for example, located opposite each other by suction jaws 12a, 12b. The jaws 12a, 12b are of a sleeve-like shape and respectively include seals 14a, 14b extending along and around the respective edges, which seals contact, in a sealed manner, the respective walls of the container 10.

After the suction jaws 12a, 12b have been placed onto the corresponding wall areas of the container, the suction jaws 12a, 12b are evacuated by a vacuum pump 15, the operation of which is controlled by a control valve 17. This evacuating causes, as shown in phantom line, a bulging of the wall areas covered by the jaws 12.

The wall areas 16 which are not covered by the suction jaws 12a, 12b are located in the illustrated example, in a normal ambient atmosphere, possibly in a chamber in which a protective gas atmosphere, such as sterile air or nitrogen is accommodated and supplied from a source S. Leakages are sensed specifically by one or more sensors 18.

A variety of sensors are suitable for this task such as travel, force, speed, acceleration or pressure or tension sensors which are of a conventional construction for generating a measured value signal such as a capacitive or inductive proximity sensor, opto-electrical sensor, etc. Since the sensors are conventional, the specific disposition and types of sensors are simply schematically illustrated in the drawings and the respective applied technique of sensing measured value signals is not further described in detail.

It is also possible for the containers 10 of FIG. 2 to be supplied, for example, in a continuous stream and to be lifted by the jaws 12a, 12b off their supporting base, with the continuous stream of containers being moved or supplied by a conveyor (not shown) such that the containers 10 are exclusively held by the jaws 12a, 12b and tested in a freely suspended or floating state. The two jaws 12a, 12b may be elastically spring biased toward each other in order to support the containers 10 prior to the application of the vacuum between the suction jaws 12a, 12b.

Figure 3:
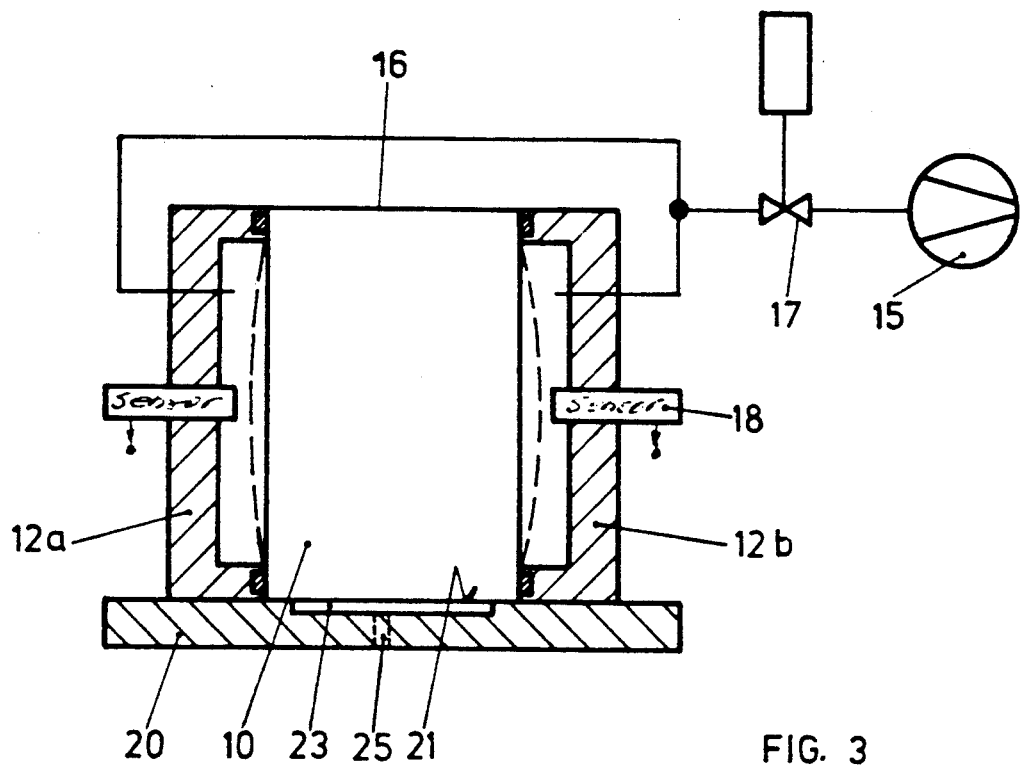
FIG. 3 is a schematic cross-sectional view of another embodiment of the apparatus constructed in accordance with the present invention.

In contrast to the embodiment of FIG. 2, in FIG. 3 the container 10 rests, during a testing by the jaws 12a, 12b on a supporting base 20. In order, however, to allow a testing of the base 21 of the container 10 regarding leakages, a recess 23 is provided in the supporting base 20 which, as shown by phantom lines 25, communicates, preferably, with the ambient such that the same pressure conditions prevail thereat.

Also in the embodiment of FIG. 3, proximity sensors 18 of a capacitive or inductive design may be employed to determine the characteristic of the container to be tested upon the increasing of the volume, for example, at which subatmospheric pressure the outwards bulging of the wall illustrated in phantom lines reaches a preset value or the wall areas 16 possibly bulges towards the inside. Alternatively to these sensors 18 may be opto-electronic sensors, pressure sensors or wire strain gauges.

It is also possible in accordance with the present invention to utilize as measure or leakage indicating measured value, the amount of air suctioned through the bore 25.

Figure 4:
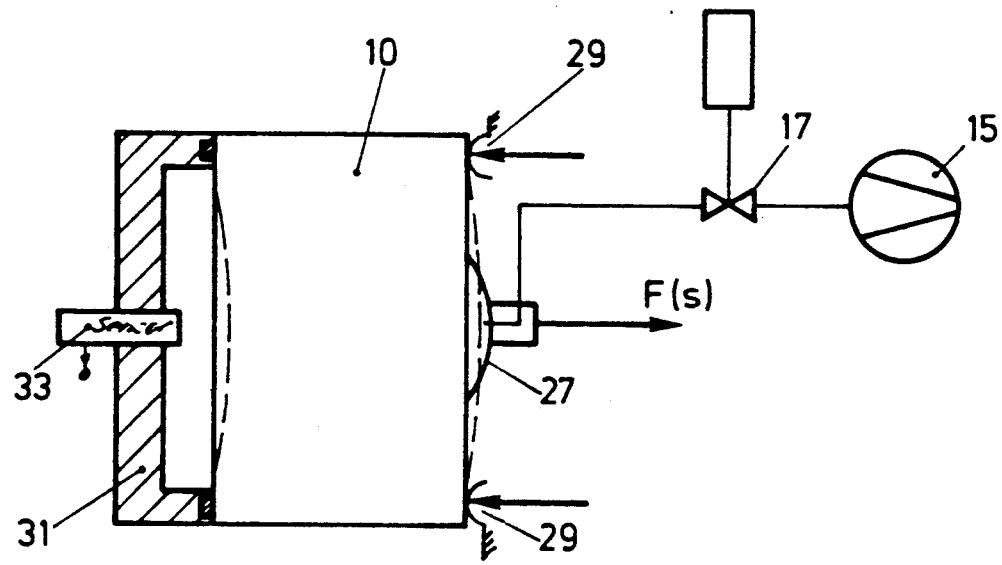
FIG. 4 is a schematic cross-sectional view of a further embodiment of an apparatus constructed in accordance with the present invention.

As shown in FIG. 4 a suction bell 27 may be applied at the container 10, which, for example, is a rectangular container, at which an increase by virtue of a mechanically induced pulling action of the volume indicated by the arrow F, is provided. By abutments 29 the edge areas, as an example, of the pulled or tensioned wall surface are subjected to a support. Here, for example, the travel/force behavior F (s) or the acceleration of the outwards bulging of the surface (illustrated by broken lines) or the speed thereof is sensed as measured value for the indication of leakage.

Furthermore, it is possible such as illustrated at the left side of the figure to provide a measuring jaw 31 at least at one wall of the container which is not acted upon by the suction jaw 27. The measuring jaw 31 may for example, be of the same type as the jaws 12a, 12b of FIGS. 2 and 3. For example, the reduced pressure from the jaw 31 due to the pulling action indicated by the arrow resulting in the inward bulging of the wall is sensed by a pressure sensor 33. Also here it is possible, in lieu of the pressure sensor 33 to provide a position sensor for sensing the inward bulging of the wall with such position sensor being for example, a capacitive or inductive sensor.

Figure 5:
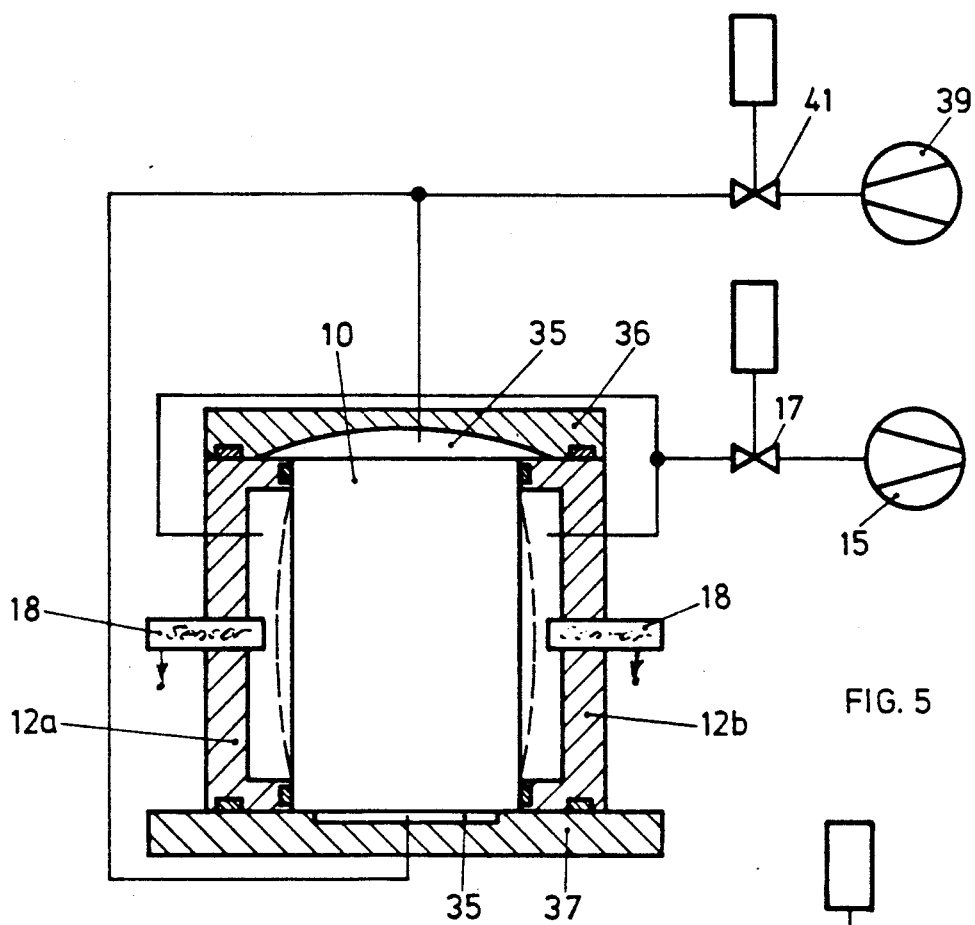
FIG. 5 is a schematic cross-sectional view of yet another embodiment of an apparatus constructed in accordance with the present invention.

In the embodiment of FIG. 5, in contrast to the embodiments of FIGS. 2 and 3, an overpressure is applied instead of atmospheric pressure. In addition to the suction jaws 12a, 12b of FIGS. 2 and 3 including the sensors 18, the walls of the container, which are not subjected to a pulling loading, are set in chambers 35 formed by jaws 36 and a supporting base 37. The chambers 35 are subjected to a pressure action by a pressure medium source 39, with the pressure being controlled by a valve 41, while the suction jaws 12a, 12b are evacuated by the vacuum pump 15 and valve 17 as described hereinabove.

Because of the areas of the container which are not subjected to a pulling load are acted upon by a pressure which is greater than atmospheric pressure, the measuring sensitivity of the apparatus is increased, that is, a smaller increase of the volume is necessary in order to open a leakage present at the walls of the container acted upon by the overpressure.

Is also possible to provide, in lieu of the position sensors, such the pressure sensors 18, to provide other sensors in the chambers 35 in order to register the decrease of pressure if due to a leakage pressurized medium is sucked from the chambers 35 into the inside of the container 10.

In the embodiments such of FIGS. 2 to 4, in case of a still acceptable or tolerable leak, ambient air is suctioned into the container 10 due to the suction bellows action, it is possible that sensitive contents of a container which has been evaluated to have no leakage, to be tight, could be negatively affected by ambient air suctioned into the container. Therefore, in accordance with the embodiment of FIG. 5, it is possible to have the overpressure chambers 35 be acted upon by a sterile gas such as sterile air or nitrogen. By such an arrangement, the smallest amounts of the pressurized medium which is suctioned into the interior of the container which may adversely influence the contents of the container is provided.

If the embodiments of FIGS. 2 to 4 and operated under a "protective gas atmosphere", the areas of the walls which there have been illustrated as being exposed to the atmosphere are tested in correspondingly structured chambers and acted upon by a sterile gas, or the entire arrangement is operated in an atmosphere of sterile gas.

Figure 6:
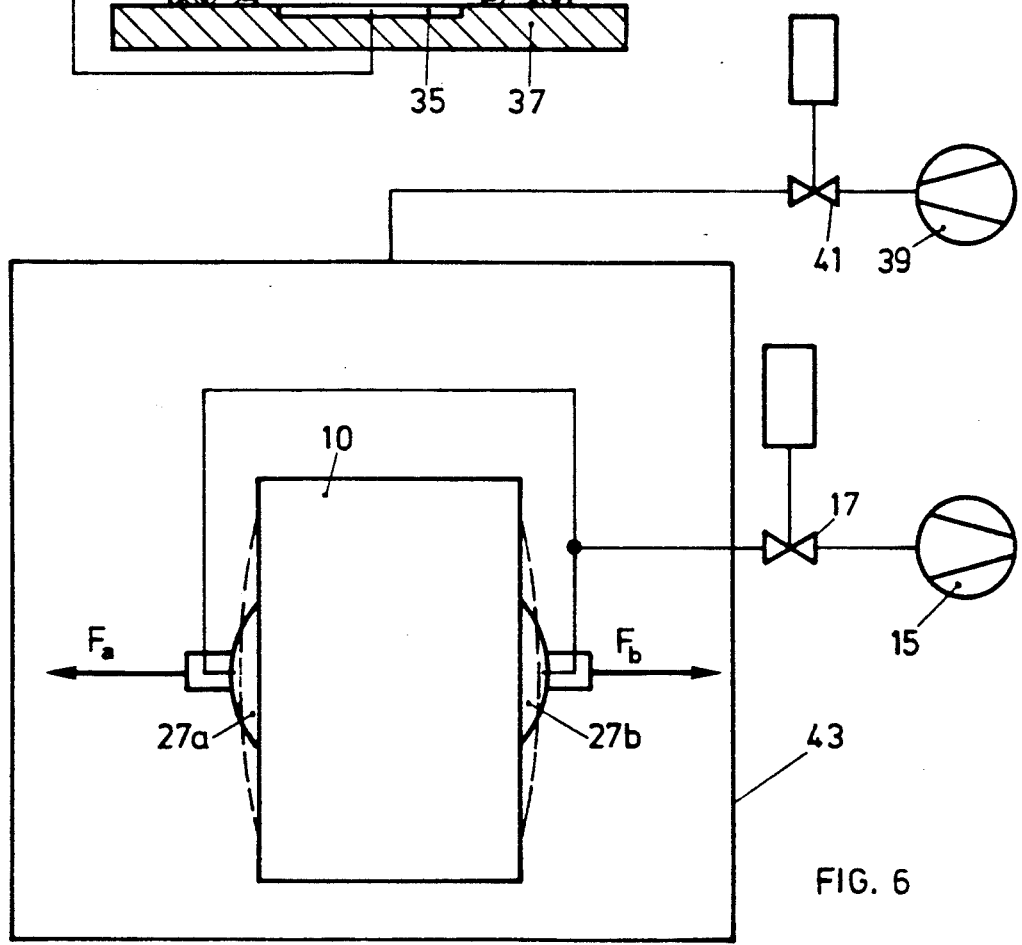
FIG. 6 is a schematic view of a further embodiment of the apparatus of the present invention for testing rectangular containers such as, for example, milk or orange juice containers.

In the arrangement or apparatus of FIG. 6, suction cups 27a and 27b, are mounted to the respective oppositely located surfaces of the container 10, and the container 10 is expanded by pulling forces $F_a$ and $F_b$.

As with the embodiment of FIG. 4, the suction cups 27a, 27b are acted upon by a vacuum of a vacuum pump 15 via a valve 17. Here the entire arrangement is located such as illustrated schematically in a protective gas chamber 43 which is acted upon via a pressure source 39 controlled by a valve 41 such that a protective gas, for example, sterile air or nitrogen is supplied a pressure which is higher than the atmospheric pressure.

Figure 7A:
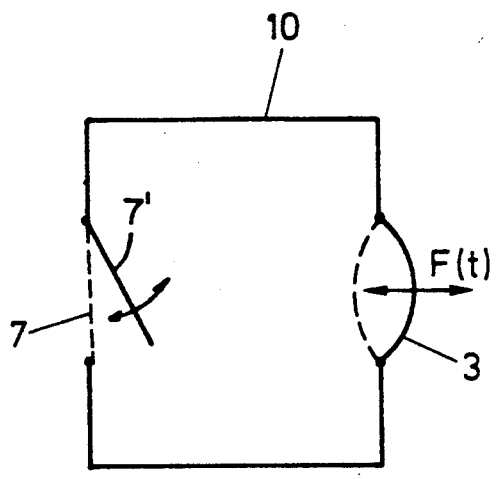
FIG. 7a is an illustration analogous to FIG. 1 illustrating the principles of the method and apparatus of the present invention.

In FIG. 7a, a container 10 to be tested is illustrated schematically, having a flexible wall area 3 and a leak 7. Here the leak 7 is illustrated as corresponding to its valve characteristic by a flap cover 7'. If the flexible wall area 3 is stretched in a volume increasing manner by the oscillating or loading force indicated by the arrow F(t) the flat cover or leakage closure 7' is opened into the position illustrated by full lines due to the flowing of the surrounding medium into the container 10.

If, conversely, the oscillating or loading force F(t) is exerted towards the inside an increase of the inner pressure is produced and the flap cover 7' is driven back into the closed position illustrated by broken lines.

Figure 7B:
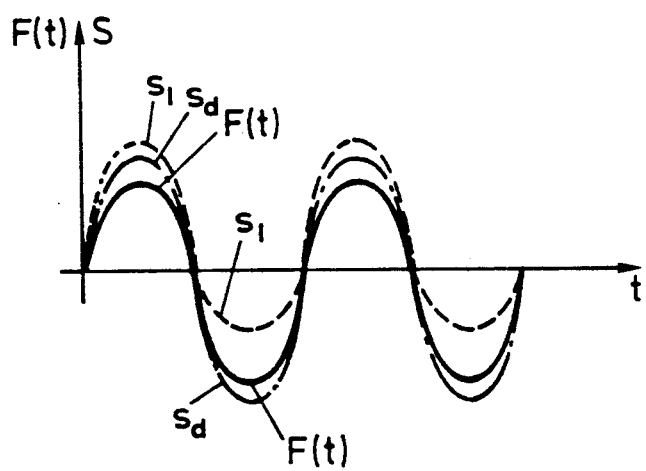
FIG. 7b is a graphical illustration of a measured variable arrived at upon an alternating load.

This can now be utilized for a further measuring technique such as, for example, illustrated in FIG. 7b. For example, an oscillating force F(t) of constant amplitude is applied in accordance with FIG. 7a. If the container 10 is tight a course of travel $S_d$ of the flexible wall area 3 is produced which follows substantially the course of the force. If a leakage 7 according to FIG. 7a is present a different course of travel arises due to its valve characteristic in the respective half waves of the force loading, such as illustrated at $s_1$. During an increase of the volume and constant amplitude, generally a longer travel of the area 3 is observed than during a reduction of the volume (compression).

The alternating signal behaviour of such leakages can obviously be detected and evaluated also by the earlier mentioned measuring sensors.

The disclosed measuring technique and the disclosed measuring arrangement or apparatus, resp. are specifically suitable for a leakage testing of containers having flexible, non-elastic walls such as beverage containers known by the name "Tetrapak" and of vacuum packaged containers, bags of foils, etc.

While there are shown and described present preferred embodiments of the invention it is to be distinctly understood that the invention is not limited thereto, but may be otherwise variously embodied and practiced within the scope of the following claims.

I claim:

1. A method of leakage testing of closed containers having a flexible wall structure at least at certain areas thereof, the method comprising the steps of increasing an inner volume of the container, measuring a change of a variable caused by a leakage in the container, wherein the container is arranged such that at least one exterior wall area is subjected to an atmosphere of a medium having a pressure greater than an interior pressure of the leak proof container which results from the increase in volume thereof, and wherein said increase of the volume is produced by mounting a pulling member onto at least one flexible wall area and by generating a mechanical pull at said member.

2. A method of leakage testing of closed containers having a flexible wall structure at least at certain areas thereof, the method comprising the steps of increasing an inner volume of the container, measuring a change of a variable caused by a leakage in the container, wherein the container is arranged such that at least one exterior wall area is subjected to an atmosphere of a medium having a pressure greater than an interior pressure of the leak proof container which results from the increase in volume thereof, and wherein the container is supported during the test at least along substantial wall sections in an atmosphere of a sterile gas, comprising one of sterile air or nitrogen.

3. A method of leakage testing of closed containers having a flexible wall structure at least at certain areas thereof, the method comprising the steps of increasing an inner volume of the container, measuring a change of a variable caused by a leakage in the container, wherein the container is arranged such that at least one exterior wall area is subjected to an atmosphere of a medium having a pressure greater than an interior pressure of the leak proof container which results from the increase in volume thereof, and wherein an oscillating change of volume is caused at the container.

4. A method of leakage testing of closed containers having a flexible wall structure at least at certain areas thereof, the method comprising the steps of increasing an inner volume of the container, measuring a change of a variable caused by a leakage in the container, wherein the container is arranged such that at least one exterior wall area is subjected to an atmosphere of a medium having a pressure greater than an interior pressure of the leak proof container which results from the increase in volume thereof, and wherein sequentially different wall areas are exposed to said atmosphere.

5. An apparatus for a leakage testing of closed containers having at least one flexible wall area, the apparatus comprising:

means for applying a pulling load and adapted to be locally placed at said at least one flexible wall area;

means for abutting the container and adapted to hold the container during exertion of the pulling load at said at least one flexible wall area; and at least one measuring sensor for detecting a measured value which changes due to the pulling load at said at least one flexible wall area, and wherein said means for applying the pulling load comprise at least one suction cup coupled to a pulling drive member.

6. An apparatus for a leakage testing of closed containers having at least one flexible wall area, the apparatus comprising:

means for applying a pulling load and adapted to be locally placed at said at least one flexible wall area;

means for abutting the container and adapted to hold the container during exertion of the pulling load at said at least one flexible wall area; and at least one measuring sensor for detecting a measured value which changes due to the pulling load at said at least one flexible wall area, and wherein said means for applying the pulling load are connected to a drive device adapted to cause a time dependent pulling load.

7. The apparatus of claim 6, in which said drive device is adapted to cause an oscillating loading.

8. A method of leak testing closed flexible walled containers, the method comprising the steps of:

applying an outward pulling load to two opposite flexible walls of said container and measuring a reaction of said closed flexible container on said opposite pulling loads, and arranging said container in such a manner that a substantial part of the wall of said container is subjected to an atmosphere of a medium having a pressure greater than an interior pressure of the leak proof container resulting from said outward pulling load.

9. The method of claim 8, wherein the step of applying said outward pulling includes applying a jaw on at least one of said two opposite flexible walls so as to sealingly contact said wall along a border thereof, and lowering the pressure within said jaw.

10. The method of claim 8, wherein the step of measuring the reaction includes measuring one of a travel distance of at least one of said two opposite flexible walls due to the application of a pulling load, a measuring of the pulling load to reaching a given displacement of at least one of said two opposite flexible walls, and a measuring of a tension in the wall of said container.

11. A method of leak testing closed flexible walled containers, the method comprising the steps of:

applying an outward pulling load to two opposite flexible walls of said container and measuring a reaction of said closed flexible container on said opposite pulling loads, and wherein the step of applying comprises fixing a flap member to at least one of said opposite flexible walls, and opening said flap member outwardly upon the application of the outward pulling load.

12. A method of leak testing closed flexible walled containers, the method comprising the steps of:

applying an outward pulling load to two opposite flexible walls of said container and measuring a reaction of said closed flexible container on said opposite pulling loads; and providing said container during leak testing along substantial portions of the container in an atmosphere of a sterile gas comprising one of sterile air or nitrogen.

13. The method of claim 12, wherein the atmosphere has a pressure equal to or greater than an initial pressure inside the container.

14. The method of claim 13, comprising the steps of exposing specifically leak prone sections of the container to said atmosphere.

15. A method of leak testing closed flexible walled containers, the method comprising the steps of:

applying an outward pulling load to two opposite flexible walls of said container and measuring a reaction of said closed flexible container on said opposite pulling loads; and applying an oscillating load to said opposite flexible walls.

16. The method of leak testing closed flexible wall containers, and the method comprising the steps of:

spanning two opposite flexible walls of said container between jaw-means, pulling an area of one of said spanned flexible walls in an outward direction, and measuring deformation of the opposite of said one flexible wall due to said pulling.

17. The method of claim 16, comprising the step of applying said outward pulling by fixing a flap member to said one wall and pulling said one wall in an outward direction.

18. The method of claim 16, further comprising the step of exposing said container during leak testing at least along substantial portions of walls of the container to an atmosphere comprising one of sterile air or nitrogen.

19. The method of claim 18, wherein the pressure of said atmosphere is equal to or greater than an initial pressure inside said container.

20. The method of claim 16, further comprising the step of oscillatingly applying said pulling.

21. An apparatus for leak testing a closed container having flexible walls, the apparatus comprising:

a first means for applying a pulling load and adapted to be placed on one of said flexible walls, second means for applying a pulling load and adapted to be placed on a second of said flexible walls opposite said one of said flexible walls, at least one measuring sensor for detecting a measured value which changes due to the pulling load at said opposite flexible walls; and means for exposing a substantial part of the wall of said closed container to an atmosphere with a pressure larger than a pressure within said closed container resulting from applying said pulling load.

22. An apparatus for leak testing closed containers having flexible walls, the apparatus comprising:

first and second holding means adapted to contact said container along opposite flexible walls and to hold said container between said holding means, a flap member adapted to be fixed to one of said opposite flexible walls and to exert a pulling load on said one flexible wall, and sensor means for detecting deformation of the other of said two opposite flexible walls.

* * * * *